United States Patent

Yang

[11] Patent Number: 6,039,876
[45] Date of Patent: Mar. 21, 2000

[54] HYDROPHILIC POLYSTRENE DIVINYLBENZENE BASED MATRIXES FOR CHROMATOGRAPHY

[76] Inventor: Yan-Bo Yang, 12839 San Juan St., Victorville, Calif. 92392

[21] Appl. No.: 08/310,813

[22] Filed: Sep. 22, 1994

Related U.S. Application Data

[63] Continuation of application No. 07/919,518, Jul. 24, 1992, abandoned.

[51] Int. Cl.⁷ .................................................. B01D 15/08
[52] U.S. Cl. ........................ 210/635; 210/656; 210/198.2; 210/502.1; 502/402; 502/439
[58] Field of Search ..................................... 210/635, 656, 210/198.2, 502.1; 525/385; 436/161; 502/402, 439

[56] References Cited

U.S. PATENT DOCUMENTS

| | | | |
|---|---|---|---|
| 2,922,768 | 1/1960 | Mino | 260/17.4 |
| 3,971,660 | 7/1976 | Staehle | 430/531 |
| 4,224,415 | 9/1980 | Meitzner | 521/38 |
| 4,382,124 | 5/1983 | Meitzner | 526/347 |
| 4,411,795 | 10/1983 | Olson | 210/692 |
| 4,412,985 | 11/1983 | Shanbrom | 210/636 |
| 4,594,225 | 6/1986 | Arai | 436/170 |
| 4,687,814 | 8/1987 | Chaumont | 525/385 |
| 4,834,886 | 5/1989 | Cadotte | 210/490 |
| 4,849,330 | 7/1989 | Humphries | 436/84 |
| 4,886,598 | 12/1989 | Barkey | 210/502.1 |
| 4,927,539 | 5/1990 | Stevens | 210/635 |
| 4,927,879 | 5/1990 | Pidgeon | 210/656 |
| 4,931,498 | 6/1990 | Pidgeon | 210/656 |
| 4,957,620 | 9/1990 | Cussler | 210/635 |
| 5,030,352 | 7/1991 | Varady | 210/502.1 |
| 5,045,190 | 9/1991 | Carbonell | 210/635 |
| 5,071,565 | 12/1991 | Fritz | 210/692 |
| 5,091,433 | 2/1992 | Wulff | 210/635 |
| 5,135,649 | 8/1992 | Kanda | 210/635 |
| 5,160,627 | 11/1992 | Cussler | 210/639 |

FOREIGN PATENT DOCUMENTS

| | | | |
|---|---|---|---|
| 3500180 | 7/1986 | Germany | 210/198.2 |

OTHER PUBLICATIONS

Yang, Ph.D. Dissertation, Ghent University, Ghent Belgium, 1986, pp. 1 and 34–35.
Yang, New Water–compatible Modified Polystyrene As a Stationary Phase for High Performance Liquid Chromatography Journal of Chromatography, 387 (1987) pp. 197–205.
Yang, High–Speed and High–Performance Size–Exclusion Chromatography of Proteins on a New Hydrophilic Polystyrene–Based Resin, Journal of Chromatography 391 (1987) pp. 383–393.

*Primary Examiner*—Ernest G. Therkorn
*Attorney, Agent, or Firm*—Donald D. Mon

[57] ABSTRACT

Disclosed is a medium for chromatography in which a body of material which is inherently hydrophobic is modified at its surface region by chemical reactions which change the chemical composition in the surface region to one whose exposed surface is hydrophilic, is integral with the core of the material, and is derivatizable.

4 Claims, 1 Drawing Sheet

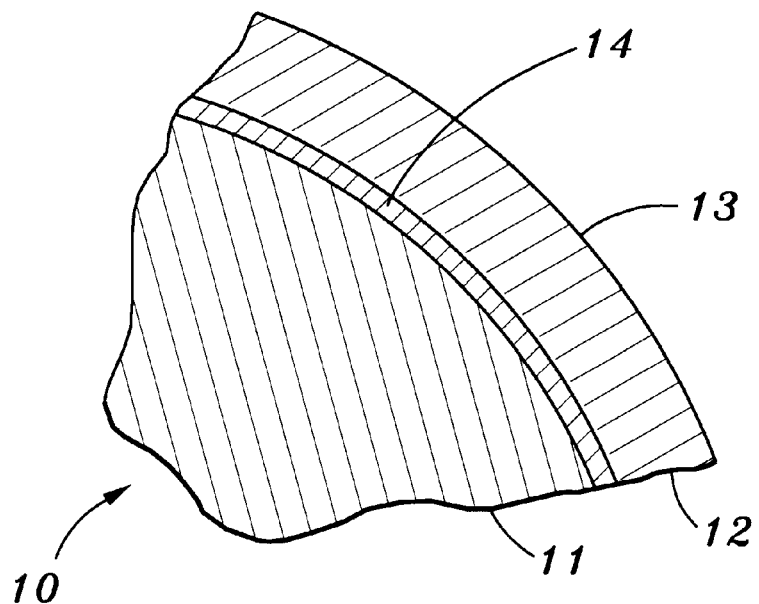

HYDROPHILIC POLYSTRENE DIVINYLBENZENE BASED MATRIXES FOR CHROMATOGRAPHY

This is a continuation of application Ser. No. 07/919,518 filed on Jul. 24, 1992, now abandoned.

SPECIFICATION

1. Field of the Invention

A medium for chromatography, particularly in the separation of proteins and other related fields, in which a body of material which is inherently hydrophobic is modified at its surface region by chemical reactions which change the chemical composition in the surface region to one whose exposed surface is hydrophilic, is integral with the core of the material, and is derivatizable.

2. Background of the Invention

Matrixes used to derivatize different stationary phases in high performance liquid chromatography (HPLC) need to be not only mechanically stable (able to withstand high mechanical pressure), but also chemically stable (being unchangeable under any strong chromatographic conditions, even with both acid and base solutions at extreme pHs). In addition to these requirements, even more important is to provide a highly hydrophilic surface with certain functional groups which are directly attached on the matrix by stable chemical bonds. The functional groups are also required to be readily derivatizable into different desired functions (for different chromatographic applications) with strong chemical linkages..

Presently-known matrixes (e.g., silica, alumina, polystyrene, polymethacrylate, and crosslinked polysugars) can meet some of these requirements, but not all. For example, a silica matrix is relatively mechanically stable and easily derivatizable, and has a hydrophilic surface. However, both the matrix itself and the chemical linkage for the derivatizations have poor chemical stability. Another example is crosslinked polystyrene-divinylbenzene (PS-DVB). This matrix is both mechanically and chemically stable. However, it does not have an easily derivatizable hydrophilic surface.

Efforts have been made to improve the silica matrix to meet those requirements for more than two decades. It appears that this is almost impossible because of its inherent chemical properties. Recent studies have shown that crosslinked PS-DVB matrixes are very promising in HPLC applications. Because of its; native surface properties, a PS-DVB matrix needs to be chemically tailored in order to meet those requirements. Two major approaches have been developed for this attempt. One is direct chemical modification to the surface. Another is a physically adsorbed crosslinked coating layer on the surface.

Chemical modifications on polystyrene have been practiced for many decades, and many modifications have been developed. However, most of the modifications have not been applied on highly crosslinked PS-DVB matrixes, and are not suitable for HPLC applications. Even certain hydrophilic crosslinked PS-DVBs can be readily obtained by chemical modifications such as sulfonation and carboxylation. These modified matrixes have only limited application (in particular, they can not be used for biopolymer separations) and can not meet the mechanical and stability requirements of which are met by the invention. To meet these requirements, the hydrophilic surface must be sufficiently hydrophilic and neutral, i.e., charge free. Two recent studies have shown that relatively hydrophilic matrixes can be obtained with chemical modifications. A chemical modification has been applied on the surface of crosslinked polystyrene beads (see Yang, Y. B., Ph.D. Dissertation, Ghent University, Ghent Belgium, 1986) by introducing glycerol functional groups onto both hydrocarbon chains and aromatic groups on the surface of the resin. The modified products were relatively hydrophilic and were applied in size exclusion chromatography (SEC) of proteins (see Yang et al, J. Chrom., Vol. 391 pp 383–393, 1987) and other separation applications (see Yang et al, J. Chrom., Vol. 387, pp 197–205, 1987). Unfortunately, the modified matrix was not hydrophilic enough to meet the quoted requirements. For instance, about 30% acetonitrile is normally needed in order to elute the proteins in the pure SEC mode. Another example is the grafting of polyethylene glycol (PEG) onto the PS-DVB matrix (Bayer, German patent #3500180). In this example, the PEG polymer chain still retains certain hydrophobic characteristics, and the small number of hydroxy groups limits the further modifications. Few applications of this matrix in HPLC have been developed.

A second approach is shown in U.S. Pat. No. 5,030,352 to Varady. A solute with multidomains (hydrophobic, hydrophilic and crosslinkable functions) is adsorbed onto the surface of the PS-DVB matrix through hydrophobic-hydrophobic interaction. The solute is then crosslinked in place to form a coating layer with their hydrophilic domains extending outwardly away from the surface while the layer is still physically adsorbed on the matrix surface through hydrophobic interaction force. The described method indeed provides a general approach to convert a hydrophobic surface to hydrophilic. However, the hydrophobic-hydrophobic interaction which holds the hydrophilic coating layer has a dynamic instability, particularly after the matrix is further derivatized and also when organic solvents are present in the surroundings.

This invention describes a technique in which a hydrophilic layer is chemically attached on the hydrophobic matrix surface by covalent bonds, thereby providing a stable modified hydrophilic surface. The modified surface layer consists of hydrophilic moieties which connect together either by chemical bonds or steric conjugates, or both. The resulting modified exposed surface provides neutral hydrophilic functional groups which can be further derivatized into different functions with stable chemical bonds formed.

The object of this invention is to provide a chromatography matrix with a neutral exposed hydrophilic surface which is stabilized on the hydrophobic substrates with chemical bonds. The hydrophobic substrate needs to be inert and mechanically stable. No labile chemical bonds are involved in the hydrophobic substrate, the hydrophilic layer, and in the connection between the hydrophilic layer and the hydrophobic substrate. The thus produced matrix has high mechanical stability, is chemically stable, withstands to a broad pH range from 0 to 14, and is resistant to erosive forces of non-oxident solutions and organic solvents which are often used in HPLC as mobile phases and column cleaning eluents. The modified surface is also biocompatible and is easily derivatizable into different functional groups in a stable chemical connection for ion exchange chromatography, affinity chromatography, reversed phase chromatography, hydrophobic interaction chromatography, and chiral phase separation, as examples.

BRIEF DESCRIPTION OF THE DRAWINGS

The single FIGURE of drawings is a fragmentary schematic cross-section of a matrix according to the invention.

BRIEF DESCRIPTION OF THE INVENTION

In this invention, a matrix 10 is developed as a hydrophobic polymer substrate 11 which has a layer 12 chemically bonded on the surface of the substrate. The exposed surface 13 of the layer is hydrophilic. It is not possible appropriately to illustrate the regions 14 where the layer bonds with the matrix. It is a chemical continuum of both, comprising the joinder by chemical reaction between them. The hydrophobic substrate is thereby modified to be hydrophilic at the surface of the layer, while keeping the matrix intact. The hydrophilic layer carries functional groups (most frequently, hydroxyl groups) easily derivatizable into different alternative functional groups for different chromatography needs and provides a surface compatible with most compounds separated in chromatography, especially with more complicated biopolymers.

This is achieved by using hydrophobic substrates with certain reactive groups which can react with poly-hydroxy-type compounds or vice verse. The poly-hydroxy-type compounds can be any oligomer and/or polymer with multiple numbers of hydroxy groups or with hydroxy groups plus other functional groups. The hydroxy groups play the roles of reacting with the reactive groups on the hydrophobic substrate, contributing to a gently neutral hydrophilic surface and providing the functional groups for further derivatization. Meantime, the poly-hydroxy-type compounds react with the hydrophobic surface, the compounds themselves crosslinked either by chemical bonds or by the conjugates of the compounds, or by both, to form an intact continuous layer held steadily on the substrate. The hydrophilic poly-hydroxy-type compounds can be made to be accessible to the hydrophobic surface of the substrate either by incorporation of certain hydrophobic moieties on the layer compounds which can be subsequently removed during the reaction on the substrate surface or by addition of certain additives in the reaction mixture.

The invention technique involves the modification of hydrophobic polymeric substrates by chemically linking an intact hydrophilic layer on the substrate surface. Therefore, a stable hydrophilic surface is formed on the surface of the final modified resin. Of great importance to this invention is that this modified surface region, which is not necessarily very thick, is not held in place by an adsorption mechanism. Instead, as finally prepared, it is integral with the substrate 11 as the consequence of having formed with the substrate material a stable layer 12 as a continuum 14 with it. The resulting matrix presents a hydrophilic surface 13 to its surroundings. This hydrophilic surface is receptive to compounds of interest in chromatographic systems.

The substrate body may consist of crosslinked polymeric resin bearing certain reactive groups. Preferably it consists of polystyrene crosslinked with divinylbenzene, with halogenated alkyl groups attached. The body can be beads which are porous or non-porous, spherical or non-spherical, which have an inert and stable core produced in known emulsion or suspension polymerization techniques.

The reactive groups incorporated with the substrate body can be introduced before and/or after the resin is made. However, the introduction of the reactive groups before the the polymerization, or using monomers which already have certain reactive groups is preferred. The reactive groups can be halogenated alkyls, epoxys, or even hydroxyl, but a chlorinated methyl group is mostly preferred. Such materials can be obtainable from several manufacturers, for example from Vydac/The Separations Group, Inc. of Hesperia, Calif.

The compounds used for the modification are oligomers or polymers with multi-hydroxy groups and/or with other functional groups. These can be polyvinyl alcohol, poly saccharides, and/ox their derivatized forms. It is preferred that derivatized polyvinyl alcohol be used in the process. The derivatized polyvinyl alcohol can be partially hydrolyzed polyvinyl acetate, and/or polyvinyl alcohol or partially hydrolyzed polyvinyl acetate with halogenated alkyl groups (preferably chloroalkyl) introduced. The polyvinyl alcohol and partially hydrolyzed polyvinyl acetates are commercially available from Aldrich Chemicals Company, Inc., Milwaukee, Wis.

The presently-preferred polyvinyl acetate when partially hydrolyzed will have a molecular weight between about 500 and about 50,000. Best results are obtained when the polyvinyl acetate is about 70% hydrolyzed, but hydrolysis between 0% and 100% also is useful.

The reaction is done in a suspension of the hydrophobic substrate in certain suitable solvents. Currently water is preferred as the reaction solvent. In the presence of partially hydrolyzed polyvinyl alcohol, the hydrophobic PS-DVB beads can be dispersed in the solvent. The reaction is performed by reacting the hydroxy groups on the partially hydrolyzed polyvinyl acetate with the chloromethyl group on the hydrophobic PS-DVB substrate in the presence of strong bases (organic or inorganic bases) to form the stable ether linkage, known as Williamson Ether Synthesis. The polyvinyl alcohol can sterically conjugate together between each individual polymer chain during the reaction or can react between each polymer chain if a chloroalkyl group has already been introduced on the polyvinyl alcohol molecule, to form a permanent structure. The access of the hydrophilic polyvinyl alcohol to the hydrophobic surface of the substrate can be made possible either by the other function groups on the polymer chains or by changing the solvent properties with addition of certain additives, for example surfactant-like compounds. Currently the former option is preferred.

One effect of the acetate moiety in the partially hydrolyzed polyvinyl acetate or introduced chloroalkyl group in the molecule is to draw the molecule closely to the resin surface in order to hold some of the hydroxyl groups accessible to the cholormethyl group and reacting with it. Another effect of the acetate group is to protect some of the hydroxyl groups from reacting with the substrate surface and to release these hydroxyl groups free and to remove the acetate itself by hydrolysis during the reaction, for hydrophilic contribution and for further derivatizations. The chloroalkyl group on the polyvinyl alcohol chain has the additional function of connecting individual chains together. Meantime the chlorine is removed either by reacting the hydroxyl group or by hydrolysis.

As a consequence of the reaction between many hydroxyl units with the resin, a large number of regions of reacted composition exist, which are strongly retained to the body by virtue of their continuity with the resin. The remaining hydroxyl units form a highly hydrophilic surface and are used for further derivatization.

Preparation of the substrate. The substrate resin is preferably made by the procedures described in Meitzner U.S. Pat. Nos. 4,224,415 and 4,382,124 issued Sep. 23, 1980 and May 3, 1983 respectively, which are incorporated in their entirety for their showing of methods to make a matrix useful in this invention.

The derivatization of this modified matrix can be performed either directly from the hydroxyl groups on the modified surface or by introducing additional function groups. Preferred examples are halogenated functions and epoxyl groups.

The preferred method of preparation of the hydrophilic layer is as follows:

1.0 g of 75% hydrolyzed polyvinyl alcohol with molecular weight of 20,000 is dissolved in 50 ml of distilled water, followed by addition of 2 g of chloromethylated PS-DVB, which is dispersed into the solution by shaking the suspension for 4 days at room temperature. The reaction is initiated with addition of 8 g of potassium hydroxide. The reaction mixture is heated up to 100 degrees C. and stirred at 100 degrees C. for 24 hr. with a Teflon-glass stirrer.

The reacted resin is filtered and washed sufficiently with about 100 ml of water, 100 ml of methanol-water (1:1) and 100 ml acetone. The resin becomes very hydrophilic and is ready for further derivatization.

The following are preferred methods for derivatization:

EXAMPLE 1

A strong cation exchanger can be produced in several ways, the following is one example of them. Specifically, 2 g modified resin is dispersed in 10 ml methylene chloride, followed by addition of 2 g epichlorohydrin. The mixture is shaken for 2 hours, 0.2 ml boron trifluoride etherate is then added into the suspension and the mixture is shaken for another 3 hours. The resin is then washed with 50 ml methylene chloride, 50 ml acetone, 100 ml water and 30 ml acetone. The resin is dried in the oven at 60 degrees C.

The resin is then suspended in 20 ml water with 4 g sodium sulfite dissolved in it. The mixture is refluxed for 20 hours. The resin is then washed with 100 ml water, 100 ml methanol and 100 ml acetone, and dried in the oven at 60 degrees C.

This is a high performance matrix, suitable for separation of proteins and their degraded products in a strong cation exchange column. The chemical stability of the material is demonstrated by three almost identical chromatograms. The first is the separation of five proteins using a pH 7.34 eluent, then the same separation after having treated it with a strong base (1.0N NaOH), and then after having treated it with a strong acid (1.0N sulphuric acid). The matrix remained chemically stable and fully functional for separation purposes even after such stringent treatments over a full range of pH values.

The material has also shown mechanical stability at pressures at least as great as 3,000 psi.

EXAMPLE 2

A strong anion exchanger can be made by first introducing epichlorohydrin onto the surface of the modified resin, followed by quaternization with trialkyl amines. More specifically, 2 g modified resin is dispersed in 10 ml methylene chloride, followed by addition of 2 g epichlorohydrin. The mixture is shaken for 2 hours. 0.2 ml boron trifluoride etherate is then added into the suspension and the mixture is shaken for another 3 hours. The resin is then washed with 50 ml methylene chloride, 50 ml acetone, 100 ml water and 30 ml acetone. The resin is dried in the oven at 60 degrees C.

The dried resin is further suspended in 20 ml methanol with 2 g of triethyl amine added. The mixture is refluxed for 24 hours. The resulting material is washed with 50 ml methanol, 100 ml water and 50 ml acetone. Proteins are efficiently separated in a column using this strong anion exchange material.

The solvents used in the reaction steps described above can be varied. Examples are ethers, acetone, and dimethyl sulfoxide. The introduced functional groups can also be changed to make chromatography material used in hydrophobic interaction chromatography, and other types of chromatography materials.

Alternate Method for Making the Matrix

The following process produces a modified resin which has a hydrophilic layer not only chemically attached on the surface of the hydrophobic substrate but which also is chemically linked between individual polymer chains.

1 g 75% hydrolyzed polyvinyl alcohol with molecular weight of 2,000 is dissolved in 25 ml dimethyl sulfoxide (DMSO). Ether or acetone could be used instead of the solvent. To the solution, 0.5 g epichlorohydrin is added, followed by 0.6 ml boron trifluoride etherate. The reaction mixture is shaken at room temperature for 3 hours. The DMSO is distilled out under vacuum and heated with warm water. The distillation residue is dissolved in 20 ml water with 1 g chloromethylated PS-DVB suspended. The reaction mixture is refluxed for 7 hours, with 6 g potassium hydroxide dissolved in the reaction mixture. The resin is filtered and washed with 50 ml water, 50 ml methanol and 50 ml acetone. This resin is now ready for derivatization. Derivatization methods in Example 1 can all be applied in this example.

The invention is not to be limited by the embodiments shown in the drawing and described in the description, which are given by way of example and not limitation, but only in accordance with the scope of the appended claims.

I claim:

1. The process for making a matrix for use in chromatography, said process comprising the following steps:
    1. providing a substrate body comprising a polystyrene divinylbenzene copolymer with reactive groups, some of which are hydrophobic, and having a surface;
    2. applying to said surface oligomer or polymer molecules, each said molecule including a plurality of hydroxy groups, whereby at least a plurality of said hydroxy groups of each said molecule form with a respective reactive group on said surface, a covalent bond, thereby chemically bonding each of said molecules to said surface at a plurality of respective locations on said surface, thereby to form a layer around said matrix, others of said hydroxy groups which did not react with said reactive groups causing the surface of said layer to be hydrophilic.

2. The process according to claim 1 in which said molecules also include a plurality of hydrophobic moieties, said hydrophobic moieties attracting said molecules toward said surface in an adsorptive mechanism to facilitate reaction of the hydroxy groups.

3. The process of claim 2 in which, the following step is next accomplished:
    by hydrolysis, removing the hydrophobic moieties from the molecules.

4. The method of claim 2 in which said molecules are partially hydrolyzed polyvinyl acetate.

* * * * *